(12) United States Patent
Bar-Zeev et al.

(10) Patent No.: US 8,570,325 B2
(45) Date of Patent: Oct. 29, 2013

(54) FILTER AND SURFACING VIRTUAL CONTENT IN VIRTUAL WORLDS

(75) Inventors: Avi Bar-Zeev, Redmond, WA (US); Blaise H. Aguera y Arcas, Seattle, WA (US); Eyal Ofek, Redmond, WA (US); Stephen L. Lawler, Redmond, WA (US); Pasquale DeMaio, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/416,035

(22) Filed: Mar. 31, 2009

(65) Prior Publication Data

US 2010/0245376 A1 Sep. 30, 2010

(51) Int. Cl.
*G06T 17/00* (2006.01)

(52) U.S. Cl.
USPC .......................................... 345/428

(58) Field of Classification Search
None
See application file for complete search history.

(56) References Cited

U.S. PATENT DOCUMENTS

| | | | |
|---|---|---|---|
| 6,266,667 B1 | 7/2001 | Olsson | |
| 6,329,986 B1 * | 12/2001 | Cheng | 345/419 |
| 6,490,577 B1 | 12/2002 | Anwar | |
| 6,545,682 B1 | 4/2003 | Ventrella | |
| 7,468,729 B1 | 12/2008 | Levinson | |
| 7,472,352 B2 | 12/2008 | Liversidge | |
| 2002/0045446 A1 | 4/2002 | Peters | |
| 2003/0135582 A1 | 7/2003 | Allen | |
| 2005/0086300 A1 * | 4/2005 | Yeager et al. | 709/204 |
| 2006/0079325 A1 | 4/2006 | Trajkovic | |
| 2006/0143569 A1 | 6/2006 | Kinsella | |
| 2007/0299713 A1 | 12/2007 | Macbeth | |
| 2008/0005047 A1 | 1/2008 | Flake | |
| 2008/0120558 A1 * | 5/2008 | Nathan et al. | 715/764 |
| 2008/0215974 A1 | 9/2008 | Harrison | |
| 2008/0274805 A1 | 11/2008 | Ganz | |
| 2008/0288573 A1 * | 11/2008 | Bellotti et al. | 709/201 |
| 2008/0316227 A1 | 12/2008 | Fleury | |
| 2009/0007346 A1 | 1/2009 | Ha | |
| 2009/0066690 A1 * | 3/2009 | Harrison | 345/419 |
| 2010/0001993 A1 * | 1/2010 | Finn et al. | 345/419 |
| 2010/0156899 A1 * | 6/2010 | Bolger et al. | 345/420 |

OTHER PUBLICATIONS

Al Masum, Shaikh Mostafa and Mitsuru Ishizuka, "Making Topic-Specific Report and Multimodal Presentation Automatically by Mining the Web Resources", IEEE/WIC/ACM International Conference on Web Intelligence, Dec. 2006, Hong Kong, pp. 240-246, published online at [http://ieeexplore.ieee.org/stamp/stamp.jsp?arnumber=04061372], retrieved on Jan. 24, 2009.

* cited by examiner

*Primary Examiner* — Edward Martello
(74) *Attorney, Agent, or Firm* — Shook Hardy & Bacon LLP (57) ABSTRACT

The claimed subject matter provides a system and/or a method that facilitates displaying virtual content within a virtual environment. A virtual environment can enable at least one user to connect in order to interact with a portion of virtual content. A collection of virtual content can be viewed from a user connected to and being present within the virtual environment. A filter component that can automatically adjust a displayable feature of a portion of the collection of virtual content based upon a relevancy to an index, wherein the adjustment of the displayable features provides at least one of an emphasis of the portion of the collection of virtual content or a de-emphasis of the portion of the collection of the virtual content.

17 Claims, 10 Drawing Sheets

FILTER AND SURFACING VIRTUAL CONTENT IN VIRTUAL WORLDS

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

In light of such advances, virtual environments or virtual three dimensional (3D) worlds have emerged. A virtual environment or virtual 3D world can be a computer-based simulated environment in which physical users can connect and interact with one another by utilizing an avatar or other graphical or textual representation. For example, a virtual world can include various users from all over the globe in which most any interaction can be implemented. A virtual world can include data or objects that are created by the host of the virtual environment as well as user-created. Thus, these virtual worlds can provide endless freedom and ability to express and interact with others as well as the ability to create unique data or objects within the virtual world.

With an increasing number of users populating virtual environments and 3D worlds, management of host-created and/or user-created data can be a daunting task. The virtual environment can include massive amounts of data for virtual representations (e.g., avatars, graphical representations, textual representations, etc.) let alone the amounts of data for various objects such as digital environments, sceneries, items (e.g., cars, clothing, jewelry, furniture, plants, decorations, etc.). Although the storage systems for such virtual environments can handle the large amounts of data, users within such worlds and environments can be overwhelmed by being immersed with the density of objects, virtual representations, and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate enhancing views within a virtual environment by removing virtual content based upon an index. A filter component can reduce noise and/or density of virtual content within a virtual environment. In general, the filter component can emphasize or de-emphasize virtual content within the virtual environment to which a user is viewing based upon relevancy to the user. The relevancy of the virtual content can be ascertained based upon an index, wherein the index can be trust, popularity, coolness, or context. The filter component can enhance virtual content if deemed relevant by adjusting a displayable property or feature of the virtual content. The filter component can also make irrelevant virtual content less prevalent by adjusting a displayable property or feature of the virtual content. The filter component can adjust visibility of virtual content in order to enhance views for a user within the virtual environment.

The subject innovation can further enable a three-phase virtual environment to be employed. Generally, the subject innovation can implement a first phase of virtual content exposure that exposes host-created virtual content, a second phase of virtual content exposure that exposes host-created virtual content and user-created virtual content, and a third phase of virtual content exposure that exposes user rank-based modified virtual content (e.g., user-created and host-crated). In other aspects of the claimed subject matter, methods are provided that facilitate evaluating virtual content within a virtual environment and adjusting the display of such content to optimize relevant content to display.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "environment," "evaluator," "content," "engine," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 1:
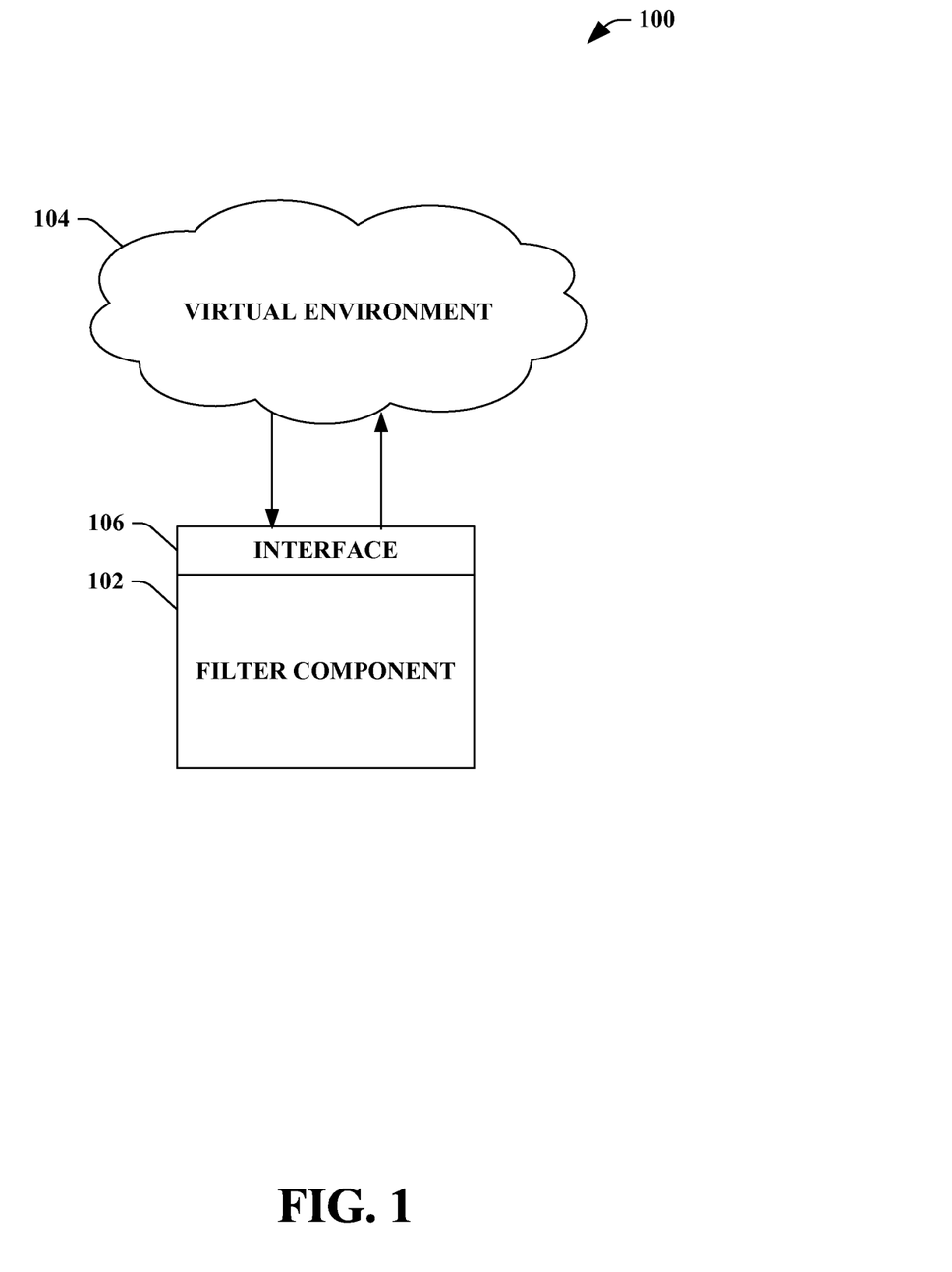
FIG. 1 illustrates a block diagram of an exemplary system that facilitates enhancing views within a virtual environment by removing virtual content based upon an index.

Now turning to the figures, FIG. 1 illustrates a system 100 that facilitates enhancing views within a virtual environment by removing virtual content based upon an index. The system 100 can include a filter component 102 that can reduce and/or remove displayed noise or density of virtual content within a virtual environment 104. In particular, the filter component 102 can adjust a displayable feature or characteristic of a portion of virtual content within the virtual environment 104 in order to enhance a user's experience such that relevant virtual content is more prevalent and/or irrelevant content is less prevalent. It is to be appreciated that the filter component 102 can adjust any virtual content hosted by the virtual environment 104 based upon an index (e.g., trust, relevancy, context, popularity, coolness, etc.) (discussed in more detail below). Yet, in general, the filter component 102 can optimize a user's view of virtual content within the virtual environment 104 based on the overwhelming amount of data or objects.

Generally, the filter component 102 can employ emphasis or de-emphasis to a portion of virtual content within the virtual environment 104, wherein the emphasis or de-emphasis can be related to a displayable characteristic such as, but not limited to, visibility, size, color, shape, opaqueness, orientation, levels of presence, and the like. For example, the more relevant an object within the virtual environment is to a user, the more visible such object can be. Similarly, the less relevant an object is to a user, the more invisible such can be displayed. By enabling virtual content to be manipulated based upon relevance, a virtual environment experience can be improved since the irrelevant objects/data is reduced (e.g., noise reduction, density reduction, etc.) for each particular user.

For example, the virtual content that can be adjusted can be a virtual representation (e.g., an avatar, a textual representation, a graphical representation, a 3D object for a user, a picture, an image, etc.) for each user. Thus, a virtual environment can include a virtual lobby in which a plurality of virtual representations can be located. Typically, a user that views such lobby within the virtual environment will have a cluttered and over-populated display since all of the plurality of virtual representations will be displayed. Yet, the subject innovation can eliminate or reduce the amount of noise (e.g., amount of displayed virtual representations) by adjusting the display characteristics of the virtual representations. For instance, if a virtual representation is relevant to a user (e.g., a friend, a relative, a trusted entity, within a geographic proximity, relevant based upon a selected index, etc.), the virtual representation can be made visible to the user. Yet, if the virtual representation is less relevant to the user, the virtual representation can be made less visible (e.g., outline of the virtual representation, less opaque virtual representation, etc.).

In addition, the system 100 can include any suitable and/or necessary interface component 106 (herein referred to as "the interface 106"), which provides various adapters, connectors, channels, communication paths, etc. to integrate the filter component 102 into virtually any operating and/or database system(s) and/or with one another. In addition, the interface 106 can provide various adapters, connectors, channels, communication paths, etc., that provide for interaction with the filter component 102, the virtual environment 104, and any other device and/or component associated with the system 100.

Figure 2:
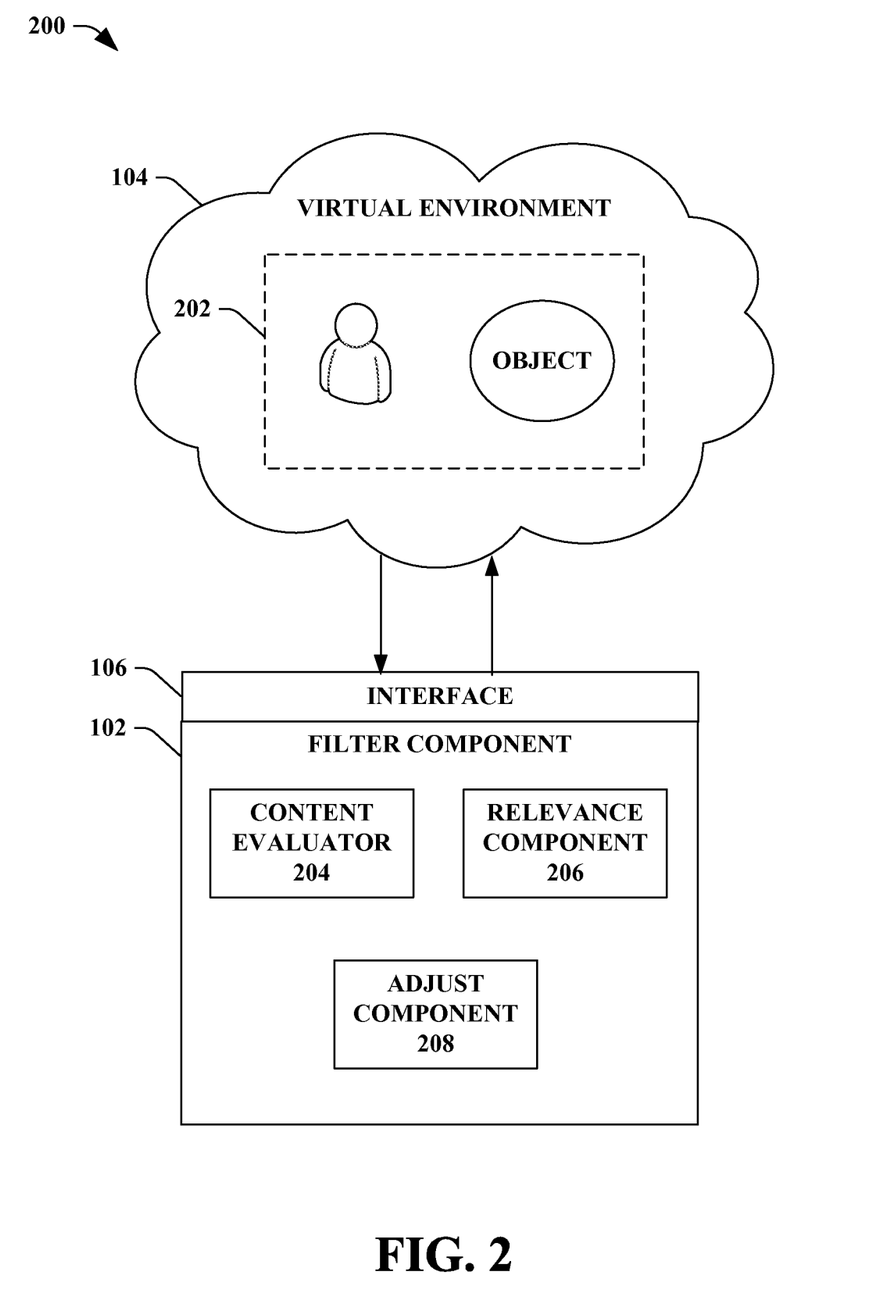
FIG. 2 illustrates a block diagram of an exemplary system that facilitates evaluating virtual content within a virtual environment and adjusting the display of such content to optimize relevant content to display.

FIG. 2 illustrates a system 200 that facilitates evaluating virtual content within a virtual environment and adjusting the display of such content to optimize relevant content to display. The system 200 can include the filter component 102 that implements at least one of an emphasis to a portion of virtual content 202 or a de-emphasis on the portion of virtual content 202 within the virtual environment based upon an index associated with relevancy to a particular user. In other words, the system 200 can enhance the perspective or view for a particular user within the virtual environment 104 in order to eliminate or reduce unrelated virtual content 202.

The virtual content 202 can include any suitable virtual object or created data within the virtual environment 104 such as, for example, an avatar 204 or an object 206. The avatar 204 can be any suitable viewable object utilized to represent a physical user within the virtual environment 104. For example, the avatar 204 can be a portion of a graphic, a portion of text, a portion of audio, a portion of video, an image, a picture, a 3D object, a 2D object, and the like. Moreover, the object 206 can be any suitable item displayed or hosted by the virtual environment 104. For instance, the object 206 can be, but is not limited to being, a portion of an item (e.g., a car, a phone, clothing, a piece of furniture, a deck of cards, a business card, a picture, a painting, a sculpture, an animal, a sign, a physical object represented within the virtual environment 104, etc.), a portion of a surrounding (e.g., a sky, a landscape, a landmark, etc.), a portion of a location (e.g., a house, a town, a business, etc.), and the like.

The filter component 102 can further include a content evaluator 208 that can dynamically identify virtual content 202 that is viewed or displayed for a particular user from his or her perspective within the virtual environment 104. In other words, the content evaluator 208 can analyze virtual content 202 within the virtual environment 104 that a particular user is viewing or is interacting therewith. Based on such identified virtual content 202, a relevance component 210 can ascertain or assign a relevance ranking. The relevance component 210 can evaluate the virtual content 202 that a particular user is interacting with and determine a relevance to such virtual content based upon an index (e.g., trust, context, popularity, coolness, relationship, etc.). For example, the relevance component 210 can assign a high relevancy ranking or score for virtual content that corresponds to a particular user based upon the index.

The relevance component 210 can identify relevant virtual content 202 within the virtual environment based at least in part upon an index. For example, the index can be, but is not limited to being, trust, relationship, popularity, context, coolness, and the like. Virtual content 202 within the virtual environment 104 can be relevant to a user based upon a level of trust. For example, a user can "trust" virtual content 202 by having a relationship with the content based upon the user opting in to the trust, inferring the trust based upon an interaction, or leveraging a relationship with the content to identify trust. Based upon the trust, the system 200 can adjust the virtual content 202 and respective displayable features. For instance, a level of trust can correspond to a level of display for the virtual content 202. In one example, a social network or environment can be leveraged in which an object that is trusted by a trusted friend may be considered trusted to you, although the greater the 'network distance,' the less trust is ascertained.

The relevance component 210 can further utilize context as an index to identify relevant virtual content 202 within the virtual environment 104. A level of context can enable virtual content 202 to be adjusted or modified, wherein the displayable feature or characteristic can be adjusted to reflect the identified correlation with the level of context. For instance, a local context can drive an object part-way from a first level of adjustment to a second level of adjustment (discussed in more detail below). For example, the context can relate to a friendship, a shared hobby (e.g., physical activities, collections, sports, etc.), interests (e.g., music, bars, restaurants, vacation spots, etc.), geography (e.g., home town, current resident, previous resident, etc.), dating preferences, activities, employment status, family properties (e.g., having kids, single, married, etc.), browsing history, group memberships, biographical information (e.g., age, sex, race, height, etc.), and the like.

The relevance component 210 can further leverage popularity or coolness as an index to adjust display features of virtual content 202. It is to be appreciated that coolness or cool can be per user and measure how much a given thing/or user (within the virtual environment) is of interest to you based on what/who you care about and what your "friends" care about. Moreover, it is to be appreciated that popularity can be related to a general user base or other users "similar to you" care about. Additionally, virtual content that is popular may be cool to a first user but not to a second user—thus cool is particular to each user whereas popular is a general consensus. The relevance component 210 can employ collaborative filtering to help users locate virtual content 202 within the virtual environment 104 that is relevant or useful to a particular user. Such virtual content 202 can be modified (e.g., promoted, demoted, etc.) in order to enhance the collective experience within the virtual environment 104. It is to be appreciated that the coolness or popularity of virtual content 202 can be offered as information to solicit but not presume trust. If deemed popular or cool, the virtual content 202 can be modified (e.g., emphasize the virtual content if relevant, de-emphasize the virtual content if not relevant, etc.). It is to be appreciated that the relevance component 210 can leverage a social network or environment to identify a popularity or coolness.

Moreover, the coolness or popularity can be a global perspective or a personal perspective. In general, the global coolness or popularity can be a generalized status to which a majority of users would deem popular or cool. For example, famous people, best-selling goods/items, etc. can be considered globally cool or popular. The global cool or popularity can affect a population within the virtual environment 104. It is to be appreciated that global coolness or popularity can be based upon context within the virtual environment 104. For example, a famous singer at a virtual concert in the virtual environment 104 can be deemed popular or cool, whereas such famous singer at a virtual sporting event may not be deemed as popular or cool. Thus, the context of popularity or coolness can be affected based upon situations to which the user is in within the virtual environment 104.

Moreover, the popularity or coolness can be a personalized perspective to where virtual content can be evaluated in order to identify whether such content is popular or cool based upon the standards of the specific user. For example, based on a user's personal preferences or information, a particular car within the virtual environment can be deemed cool or popular, whereas the same particular car may not be deemed cool or popular for a disparate user. Thus, a personal cool or popularity can affect a specific user or person within the virtual environment 104. In another example, a creator of virtual content that is popular or cool can be deemed cool and popular based upon such creation. In still another example, coolness or popularity can be established based upon traffic (e.g., network traffic, virtual interaction with an object, virtual interaction with a virtual representation, etc.) within the virtual environment 104. Within a virtual environment, an avatar can be communicating to other avatars, and based upon such crowding or group around the speaking avatar, coolness or popularity can be identified.

The filter component 102 can further include an adjust component 212 that can modify the virtual content 202 based at least in part upon the identified relevance (e.g., ranking, score, ascertained correspondence, etc.). The adjust component 212 can modify any suitable displayable characteristic or feature for the virtual content 202 within the virtual environment 104. For example, the displayable characteristic or feature can be, but is not limited to, visibility, size, color, shape, opaqueness, orientation, level of presence, etc.

The adjust component 212 can invoke granular levels of displayable characteristics or features based on a level of relevance. In an example, the displayable characteristic can be visibility in which granular levels of opaqueness and/or level of interaction can be adjusted accordingly. For example, a first level can correspond to unreal virtual content, a second level can correspond to ghosted virtual content, a third level can correspond to mostly visible virtual content, a fourth level can correspond to interactive virtual content, and a fifth level can correspond to fully real virtual content.

The first level can be virtual content that is invisible and has no physical presence within the virtual environment 104. However, the virtual content may be visible to someone else, so it exists on the host (e.g., virtual environment server, network, etc.), if not the user's client. If an avatar a user can see is local to or interacting with such an invisible (to the user) object, then rather than allow the incongruity, the system 200 can either promote the object to another level (e.g., the second level), or move that avatar into a bubble of reality, depending on the circumstance.

The second level can be virtual content that is ghosted. The virtual content can be visible to the user, but using a 2D or 3D stand-in you pick from and approved set for safety. This can be analogous to the 'alt image' in HTML, except the choices can be constrained. The virtual content can be considered 'spirited.' The default and simplest spirit can be a wireframe or a shimmering bounding box. For example, a custom car can be better represented by selecting an approved car, which lacks your modified textures and geometry. Moreover, a spirited avatar may use 2D sprites with generic clothing & accessories. The lack of physical presence requires some visual feedback, such as translucency.

The third level can be mostly visible virtual content. Similar to the second level, except now the user can see custom detail, texture, geometry of the virtual content (e.g., the car utilized in the example) instead of the generic stand-in. The object can be present, but not yet physical, and thus visual feedback is still required.

The fourth level can be interactive, wherein the fourth level can be similar to the third level yet include any non-moving, non-scripted portions of the object are considered physical (e.g., the user can stand on them). The virtual content can be include scripted or dynamic portions remain that are equivalent to the third level, since they could pin or throw the user. For example, the virtual content can be visible but include safe segments of the virtual content that can be considered physical and opaque (e.g., you can push buttons, but a car can't run you over). Moreover, portions of the virtual content can include avatar side-effects that are equivalent to the third level.

The fifth level can include virtual content that can be fully real to the user, and can affect the user, push the user, and transact. For example, virtual content can include full interaction with games, rides, automatic teller machines (ATMs), etc. Additionally, virtual content within the fifth level can require the user to initiate an action—to choose to enter the game via a doorway or press a button or click the equivalent of a popup to proceed. Moreover, there can be a preference to auto-initiate, but it has to be clear and deliberate from the user.

In one example, the subject innovation can provide enhanced viewing or display of virtual content within the virtual environment 104. For example, the index can be based upon a coolness or popularity, followed by a proximity in which the following can be employed: user, VIP (think a performer or someone who has been "cooled" past some threshold), active engagement with (e.g. you are chatting with someone), friends, friends of friends, people you interacted with recently (e.g. you were chatting with someone), people you anointed "cool," groups and networks, people who "cooled" you, random folks, and blocked people (note they still appear, perhaps with no customization).

Figure 3:
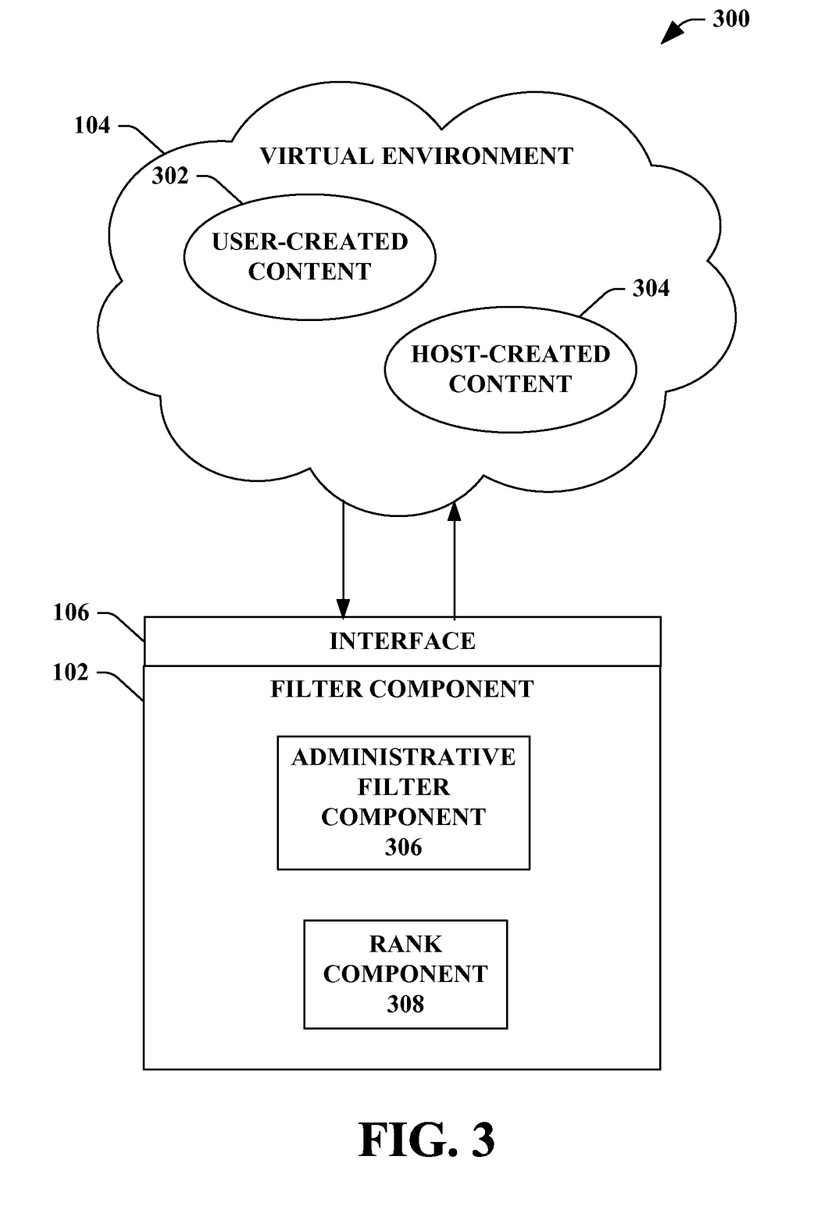
FIG. 3 illustrates a block diagram of an exemplary system that facilitates employing a filtering technique to user-created content and host-created content within a virtual environment.

FIG. 3 illustrates a system 300 that facilitates employing a filtering technique to user-created content and host-created content within a virtual environment. The system 300 can improve personal experiences in the virtual environment 104 in order to attract and retain a broader set of users than existing virtual environments. The surfacing and filtering of virtual content can be provided in an information rich environment. Moreover, the system 300 can manage the display and communication of thousands to millions of avatars and virtual content in the virtual environment 104. Performance of virtual environments can be improved because a smaller set of virtual content is displayed for any given user—others can be minimized (e.g., as 2D sprites) or excluded from both rendering and local network traffic.

The subject innovation can further assist in helping users find existing and new friends in a dense virtual environment. Moreover, by adjusting the displayable characteristics based on relevancy or indexes, harassment can be minimized (e.g., virtual harassment, assault, negative behaviors, etc.). For example, harassment can be minimized because any bad actor can be rendered effectively impotent by any user by adjusting the display characteristics (e.g., making the content or actor invisible, "uncool," unpopular, or untrusted, etc.). The subject innovation can further reconcile conflicting goals of having a UGC-rich world, without experiencing unwanted objectionable, irrelevant, or "bad" content. Moreover, the system 300 can improve computational and bandwidth efficiency of virtual environments for increased performance and scalability.

The system 300 can include the filter component 102 that can reduce noise or density within the virtual environment 104 by de-emphasizing irrelevant virtual content and/or emphasizing relevant virtual content. By modifying a displayable feature or property of virtual content based upon an index (e.g., relevancy, trust, relationship, context, popularity, coolness, etc.), a user viewing virtual content within the virtual environment 104 can be protected or shielded from various portions of virtual content. For example, the viewable content displayed from the perspective of the user can be de-emphasized based on what is appropriate or approved.

The filter component 102 can be utilized in any suitable virtual environment 104 such as a three-phase virtual environment. The virtual environment 104 can include user-created virtual content 302 and/or host-created virtual content 304. The user-created virtual content 302 can be any suitable content within the virtual environment 104 that is user-created or defined. The host-created virtual content 304 can be any suitable virtual content within the virtual environment 104 created by a host of the virtual environment 104, an administrator of the virtual environment 104, or a service provider of the virtual environment 104.

The three-phase virtual environment can be employed with the subject innovation. In particular, the three-phase virtual environment can enable a first phase in which a user is only exposed or able to view host-created content within the virtual environment 104. In a second phase, the user can be exposed or able to view host-created virtual content and user-created content within the virtual environment. A third phase can allow a user to view host-created content and user-created content, wherein the user-created content can be displayed based upon a ranking or user-based relevancy ranking.

The three-phase virtual environment or system can filter and surface user-created content 302 such that some users can experience a single consistent shared world full of safe content, while other users can delve into more dynamic views of the world, subject to their interests and those of their friends. The system 300 can split the universe or virtual environment 104 into three main levels of experience—personal, shared, and universal (alpha, beta, and omega worlds). The virtual environment 104 can be reconciled to only the most appropriate, the most "cool," and most trusted content, while the shared world is subject to more complex rules of who sees what based on a more variable concept of context, coolness, and trust. Content would typically be propagated up from personal to shared (where it could be collaboratively filtered and promoted) and only the best content makes it to the universal level, including our "head" data.

The filter component 102 can include an administrative filter component 306 that can filter virtual content within the virtual environment 104 in which virtual content that is host-created can be displayed or viewable for a particular user. The administrative filter component 306 can enable a user to increase exposure to virtual content based upon a received request. For example, a user can request an upgrade in exposed virtual content in which more virtual content will be viewable for that specific user. The administrative filter component 306 can further ascertain which virtual content (e.g., host-created content, user-created content, etc.) can be exposed to the user.

The filter component 102 can further include a rank component 308 that can receive user rankings for exposed virtual content within the virtual environment 104. The rank component 308 can collect or gather user information related to ranking or scoring virtual content within the virtual environment 104. The rankings can be related to host-created content, user-created content, and/or any suitable combination thereof. The virtual content within the virtual environment 104 can further be adjusted or modified based upon the rankings, wherein a high ranking (signifying the user likes the content) can be emphasized and a low ranking (signifying the user dislikes the content) can be de-emphasized.

Figure 4:
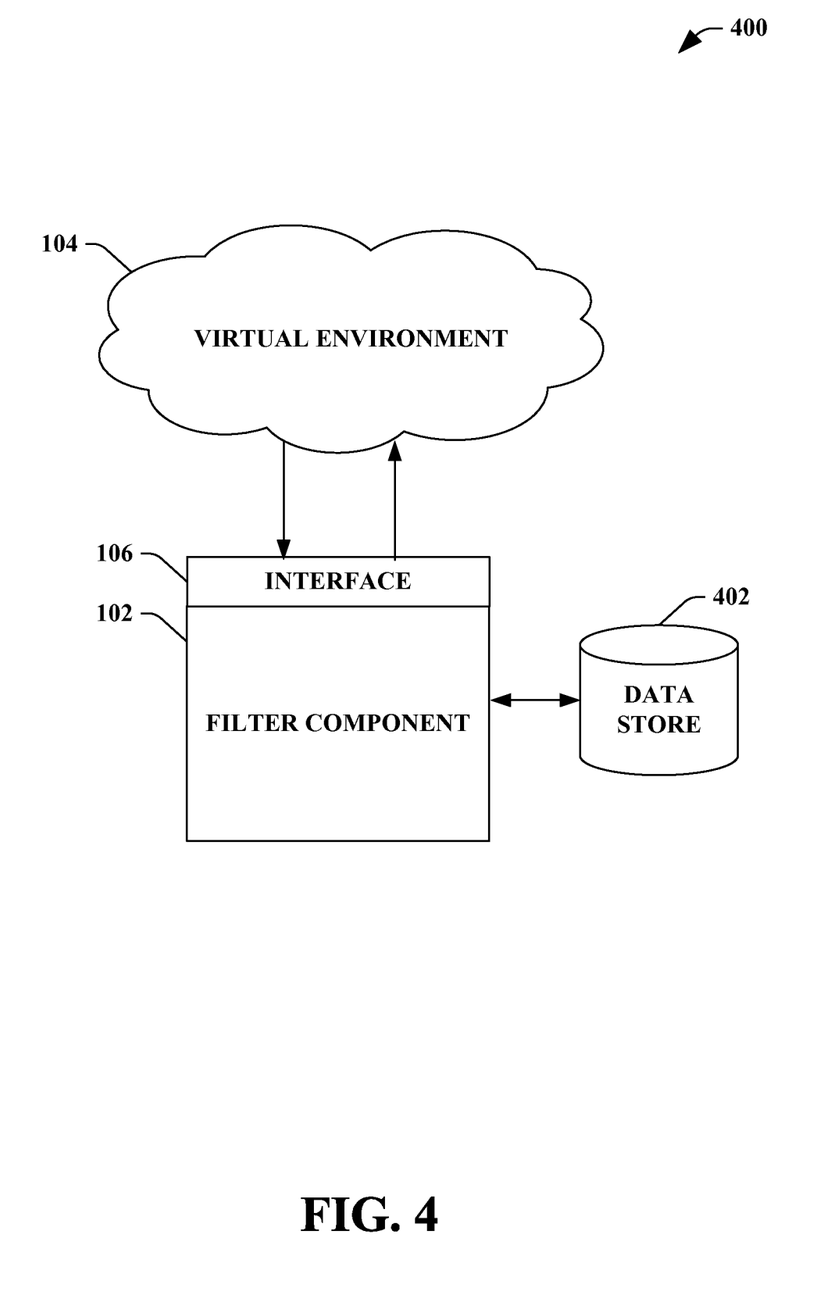
FIG. 4 illustrates a block diagram of an exemplary system that facilitates emphasizing relevant content within a virtual world based upon a pre-defined context.

FIG. 4 illustrates a system 400 that facilitates emphasizing relevant content within a virtual world based upon a pre-defined context. The system 400 can further include a data store 402 that can include any suitable data related to the filter component 102, the virtual environment 104, etc. For example, the data store 402 can include, but not limited to including, indexes, relevance rankings/scores, viewed or accessed virtual content, history related to interaction of virtual content, preferences, contexts, trusts, friends, popularities (e.g., global, personal, etc.), virtual content properties (e.g., owner, creator, traffic, etc.), history for adjustments to displayable features, user definitions for displayable features, level of presence settings/characteristic, any suitable data associated with the subject innovation, etc.

It is to be appreciated that the data store 402 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 308 of the subject systems and methods is intended to comprise, without being limited to, these and any other suitable types of memory. In addition, it is to be appreciated that the data store 402 can be a server, a database, a hard drive, a pen drive, an external hard drive, a portable hard drive, and the like.

Figure 5:
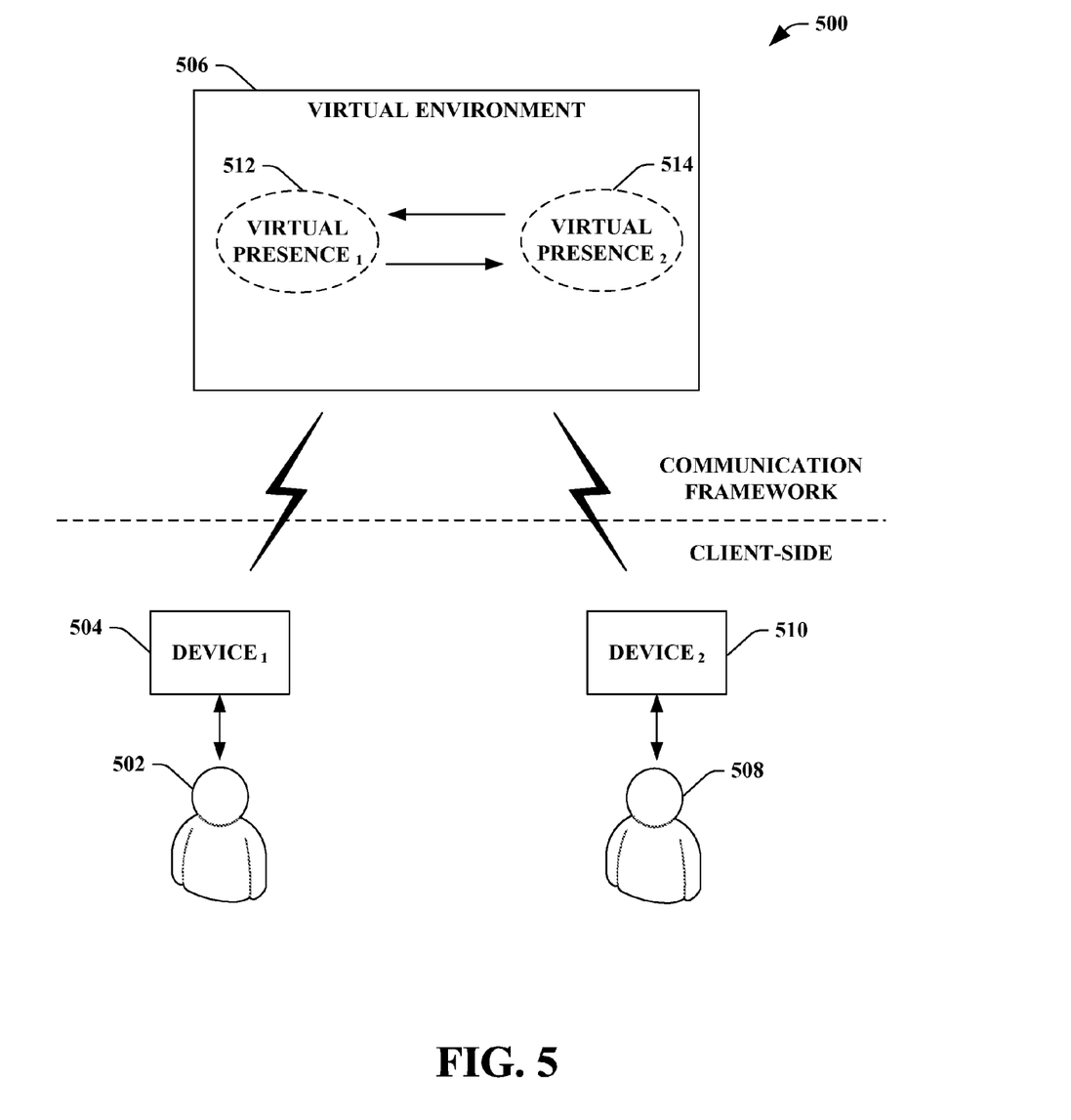
FIG. 5 illustrates a block diagram of exemplary system that facilitates employing a virtual environment in which one or more users can be virtually represented to communicate therein.

FIG. 5 illustrates a system 500 that facilitates enabling two or more virtually represented users to communicate within a virtual environment on a communication framework. The system 500 can include at least one physical user 502 that can leverage a device 504 on a client side in order to connect to a virtual environment 506 on a communication framework. Additionally, the user 502 can utilize the Internet, a network, a server, and the like in order to connect to the virtual environment 506 hosted by a service provider on a communication framework. In general, the physical user 502 can utilize the device 504 in order to provide input for communications within the virtual environment 506 as well as receive output from communications related to the virtual environment 506. The device 504 can be any suitable device or component that can transmit or receive at least a portion of audio, a portion of video, a portion of text, a portion of a graphic, a portion of a physical motion, and the like. The device can be, but is not limited to being, a camera, a video capturing device, a microphone, a display, a motion detector, a cellular device, a mobile device, a laptop, a machine, a computer, etc. For example, the device 504 can be a web camera in which a live feed of the physical user 502 can be communicated for the virtual environment 506. It is to be appreciated that the system 500 can include a plurality of devices 504 to interact within the virtual environment 506.

The system 500 can enable a physical user 502 to be virtually represented within the virtual environment 506 for remote communications between two or more users or entities. The system 500 further illustrates a second physical user 508 that employs a device 510 to communicate within the virtual environment 506. As discussed, it is to be appreciated that the virtual environment 506 can enable any suitable number of physical users to communicate within the session. The virtual environment 506 can be managed by a service provider on the communication framework in which the virtually represented users can communicate. For example, the virtual environment 506 can allow data to be communicated such as, voice, audio, video, camera feeds, data sharing, data files, etc.

Figure 6:
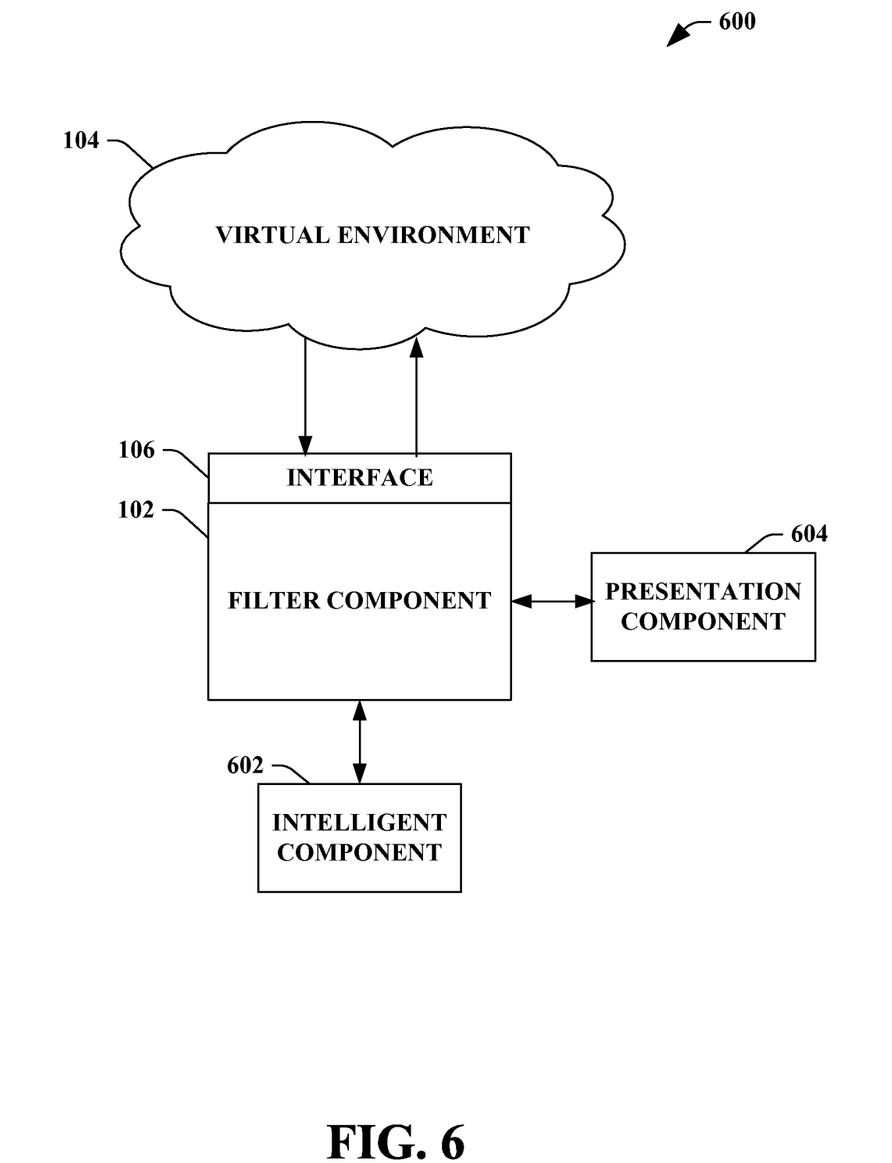
FIG. 6 illustrates a block diagram of an exemplary system that facilitates automatically identifies and adjusts relevant virtual content within a virtual environment.

FIG. 6 illustrates a system 600 that employs intelligence to facilitate automatically identifies and adjusts relevant virtual content within a virtual environment. The system 600 can include the filter component 102, and the virtual environment 104, which can be substantially similar to respective components, and environments described in previous figures. The system 600 further includes an intelligent component 602. The intelligent component 602 can be utilized by the filter component 102 to facilitate modifying viewable attributes associated with virtual content within the virtual environment 104 based upon an index (e.g., relevancy, coolness, popularity, context, trust, relationship, etc.). For example, the intelligent component 602 can infer index correspondence to a user, relevancy, coolness, popularity, adjustments/modifications to virtual content, displayable properties to adjust, personal preferences, level of presence for virtual content, trust, relationships, context, personal tastes, personal hobbies, personal interests, virtual content properties, etc.

The intelligent component 602 can employ value of information (VOI) computation in order to identify a relevant index to base modifications to virtual content to reflect correlation. For instance, by utilizing VOI computation, the most ideal and/or appropriate relevancy index can be determined in order to emphasize or de-emphasize virtual content efficiently within the virtual environment 104. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The filter component 102 can further utilize a presentation component 604 that provides various types of user interfaces to facilitate interaction between a user and any component coupled to the filter component 102. As depicted, the presentation component 604 is a separate entity that can be utilized with the filter component 102. However, it is to be appreciated that the presentation component 604 and/or similar view components can be incorporated into the filter component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the filter component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
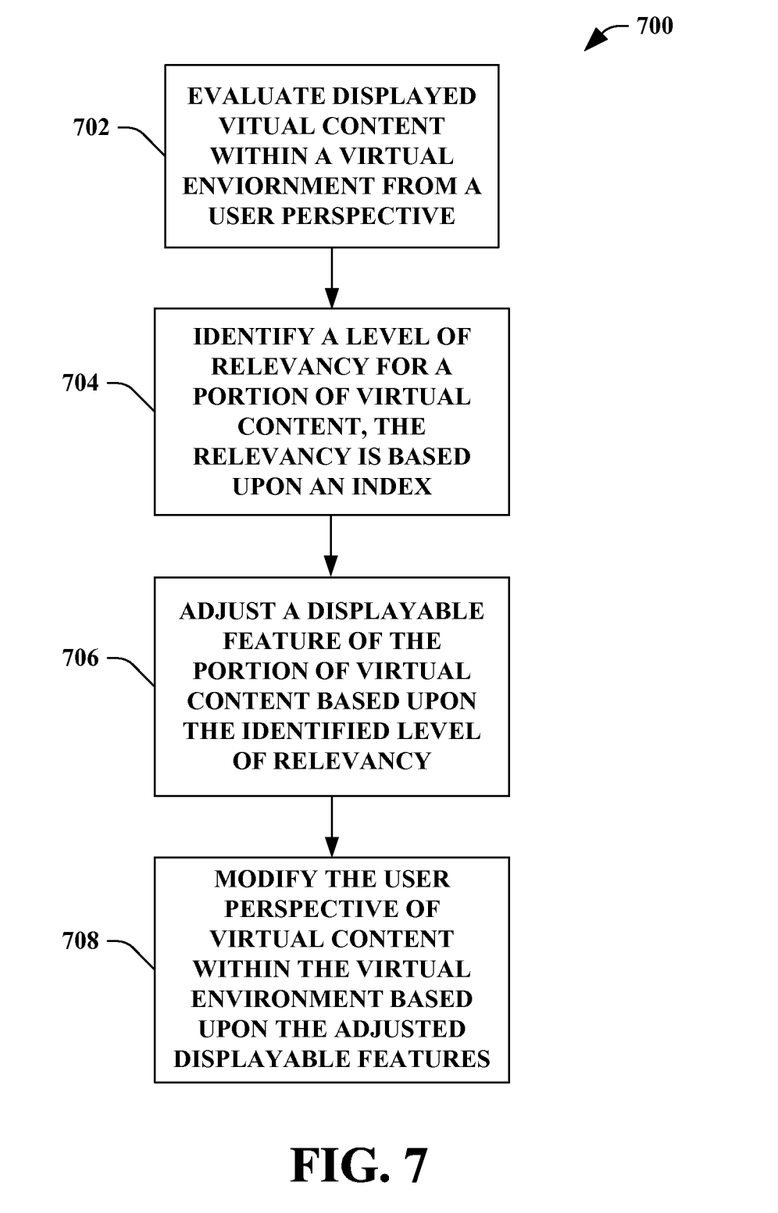
FIG. 7 illustrates an exemplary methodology for enhancing views within a virtual environment by removing virtual content based upon an index.
Figure 8:
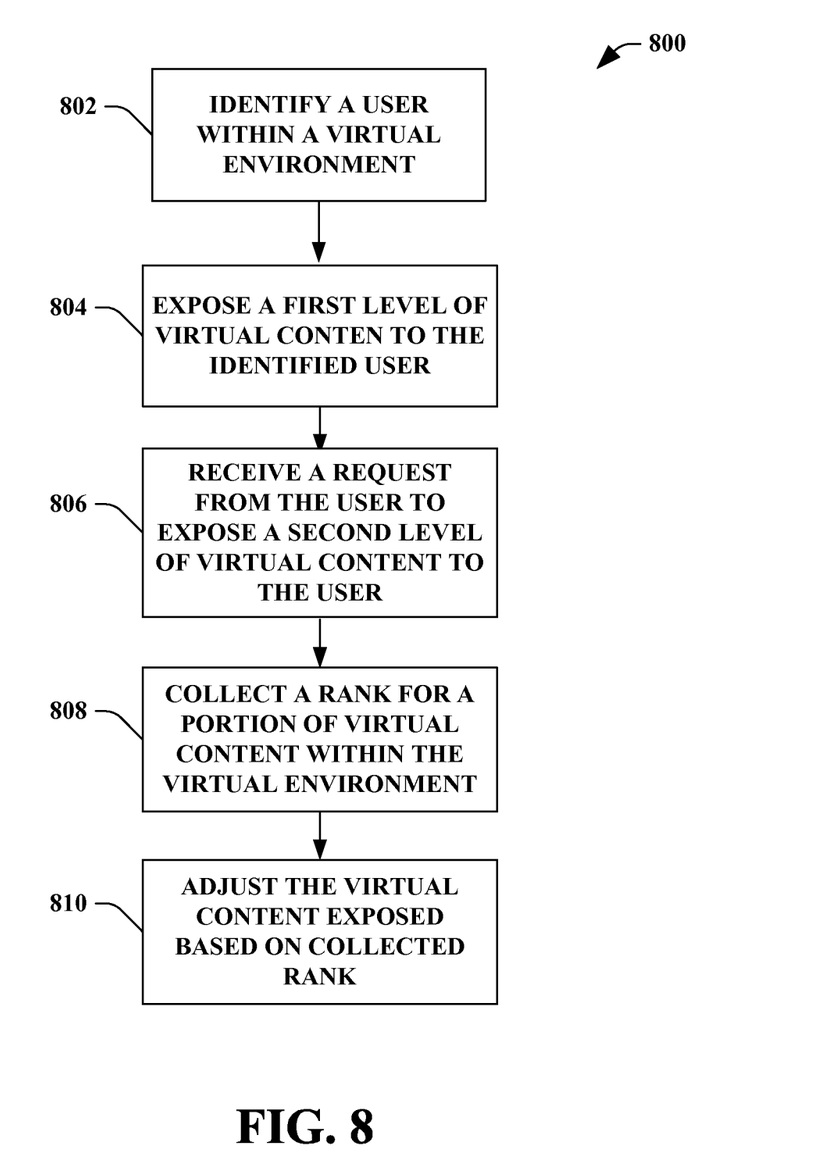
FIG. 8 illustrates an exemplary methodology that facilitates employing a filtering technique to user-created content and host-created content within a virtual environment.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates enhancing views within a virtual environment by removing virtual content based upon an index. At reference numeral 702, displayed virtual content within a virtual environment from a user perspective can be evaluated. In other words, a collection of virtual content from a user perspective within a virtual environment can be evaluated in real time. At reference numeral 704, a level of relevancy for a portion of virtual content can be identified, wherein the relevancy is based upon an index. The index can be, but is not limited to being, a context, a trust, a friendship, a relationship, popularity, coolness, and the like.

At reference numeral 706, a displayable feature of the portion of virtual content can be adjusted based upon the identified level of relevancy. The displayable feature can be, for instance, visibility, size, color, shape, opaqueness, orientation, levels of presence, and the like. At reference numeral 708, the user perspective of virtual content can be modified within the virtual environment based upon the adjusted displayable features. In other words, a view for a particular user within the virtual environment can be modified in which virtual content can be emphasized or de-emphasized based on the identified level of relevancy.

FIG. 8 illustrates a method 800 for employing a filtering technique to user-created content and host-created content within a virtual environment. At reference numeral 802, a user within a virtual environment can be identified. At reference numeral 804, a first level of virtual content can be exposed to the identified user. For example, the first level of virtual content can be host-created virtual content, wherein the content is approved by an administrator. At reference numeral 806, a request from the user can be received in which the request is to expose a second level of virtual content to the user. The second level of virtual content can include user-created virtual content within the virtual environment. At reference numeral 808, a rank for a portion of virtual content within the virtual environment can be collected. At reference numeral 810, the virtual content exposed can be adjusted based on the collected rank.

Figure 9:
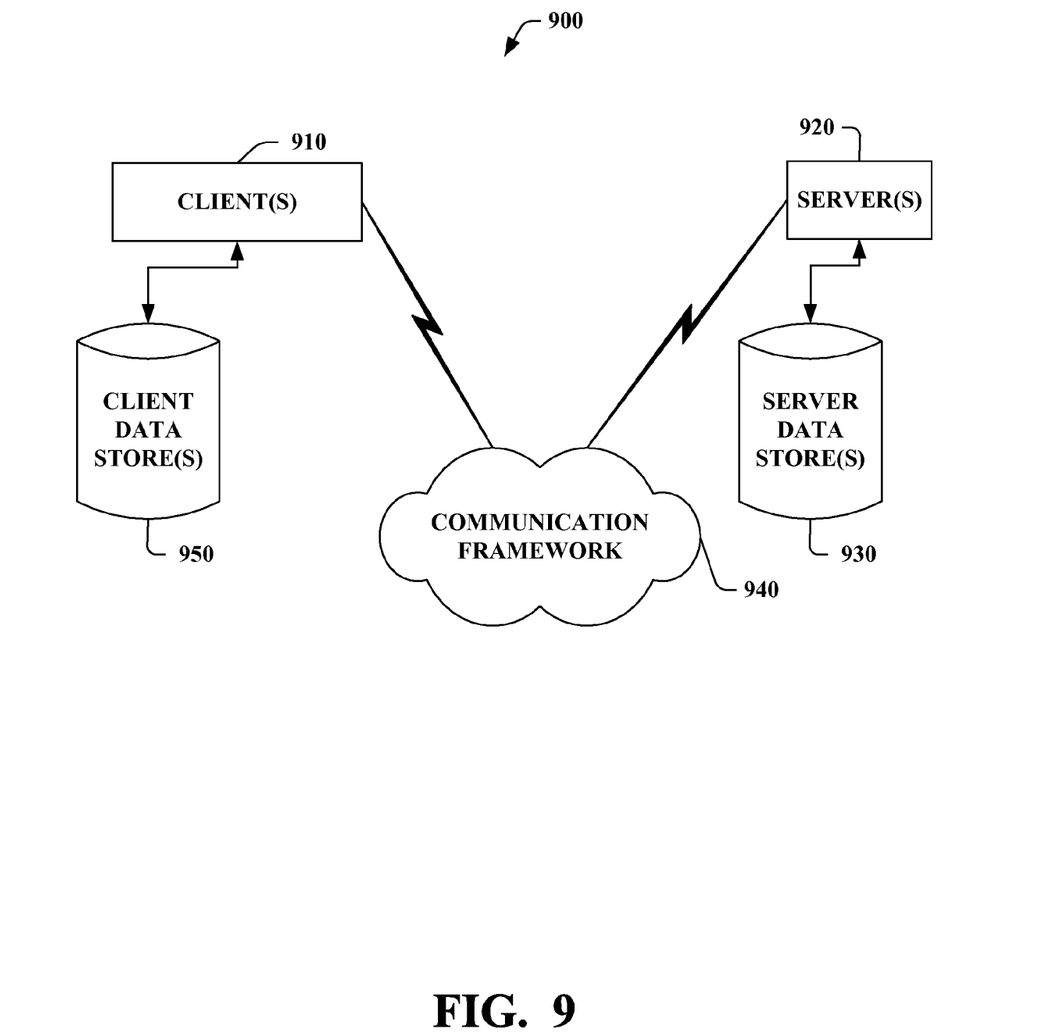
FIG. 9 illustrates an exemplary networking environment, wherein the novel aspects of the claimed subject matter can be employed.
Figure 10:
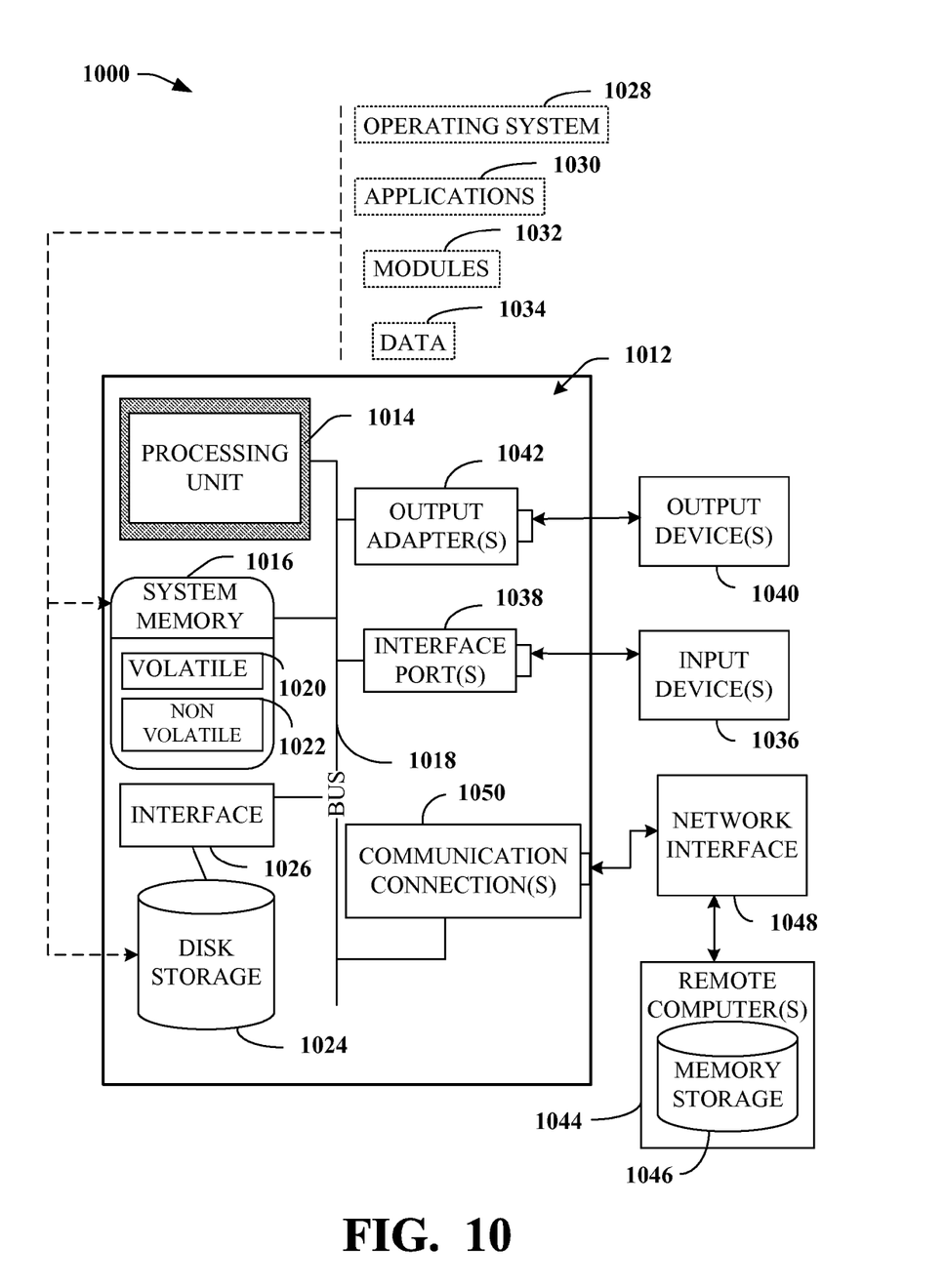
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a filter component that adjusts a displayable feature for virtual content within a virtual environment, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates displaying virtual content within a virtual environment, comprising:
   a virtual environment that includes a first virtual representation that represents a first user, wherein the virtual environment is usable by the first user controlling the first virtual representation to connect with the virtual environment in order to interact with virtual representations representing other users;
   a second virtual representation representing a second user that is presented in the virtual environment and that is viewable to the first user controlling the first virtual representation; and
   a filter component that determines a relevance of the second virtual representation to the first user based on a level of trust between the first user and the second virtual representation and that automatically adjusts a displayable feature of the second virtual representation representing the second user based on the level of trust, wherein the adjustment of the displayable feature provides at least one of an emphasis of the second virtual representation or de-emphasis of the second virtual representation.

2. The system of claim 1, the displayable feature is at least one of a visibility, a size, a color, a shape, an opaqueness, an orientation, or a level of presence within the virtual environment.

3. The system of claim 1, wherein the second virtual representation is an avatar.

4. The system of claim 1, wherein the relevance is also determined based on a context, a popularity, or a combination thereof.

5. The system of claim 4, wherein the level of trust is identified based upon at least one of an amount of interaction with the second virtual representation, a relationship associated with at least one of a social network or the virtual environment, or a relationship with the second user.

6. The system of claim 4, wherein the context is at least one of a friendship, a shared hobby, an interest, a geography, a dating preference, an activity, an employment status, a family property, a browsing history, a group membership, or a portion of biographical information.

7. The system of claim 4, wherein the popularity is at least one of a global perspective that affects a population within the virtual environment or a personal perspective that affects a particular user.

8. The system of claim 1, further comprising:
a content evaluator that identifies the second virtual representation; and
a relevance component that assigns a relevancy score to the second virtual representation based upon a correlation with a trust index.

9. The system of claim 8, further comprising an adjust component that modifies the displayable feature based on the level of trust.

10. The system of claim 9, wherein the displayable feature is a level of presence that includes a first level that corresponds to unreal virtual content, a second level that corresponds to ghosted virtual content, a third level that corresponds to mostly visible virtual content, a fourth level that corresponds to interactive virtual content, and a fifth level that corresponds to fully real virtual content.

11. The system of claim 10, further comprising a rank component that collects a rank that applies to the second virtual representation and that is provided by the first user.

12. The system of claim 11, the virtual environment is a three-phase virtual environment that exposes virtual content in a first phase, a second phase, and a third phase.

13. The system of claim 12, the three-phase virtual environment includes the following:

the first phase exposes host-created virtual content;
the second phase exposes user-created virtual content and host-create virtual content; and
the third phase modifies the displayable feature of at least one of the user-created virtual content or the host-created virtual content, the modification is based upon the collected rank.

14. A computer readable memory device storing computer executable instructions that, when executed, perform a method that facilitates enhancing a virtual experience within a virtual environment, comprising:
identifying a virtual representation that represents a user of the virtual environment and that is displayed to another user within the virtual environment;
referencing a second virtual representation, which represents the other user of the virtual environment, in an index to determine that the user and the other user share a connection in a social network; and
emphasizing a displayable feature of the second virtual representation in response to determining that the user and the other user share the connection in the social network.

15. The method of claim 14, wherein a level of relevance of the second virtual representation to the other user is also determined based on a level of trust between the user and the second virtual representation and wherein the displayable feature is adjusted based on the level of trust and the connection in the social network.

16. A computer-implemented method that facilitates enhancing a virtual experience within a virtual environment, comprising:
presenting the virtual environment to a user, wherein the virtual environment includes a first virtual representation representing the user in the virtual environment, and wherein the virtual environment includes a second virtual representation that is viewable by the user and that represents a second user in the virtual environment;
referencing an index to determine a context of the second virtual representation as it applies to the user; and
adjusting a displayable feature of the second visual representation representing the second user based on the context.

17. The method of claim 16, wherein the context includes a friendship between the user and the other user and wherein adjusting the displayable feature includes rendering the second virtual representation viewable to the user.

* * * * *